United States Patent
Han

(10) Patent No.: US 9,429,801 B2
(45) Date of Patent: Aug. 30, 2016

(54) LCD PANEL AND LCD DEVICE

(71) Applicant: Shenzhen China Star Optoelectronics Technology Co., Ltd., Shenzhen, Guangdong (CN)

(72) Inventor: Bing Han, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 140 days.

(21) Appl. No.: 14/383,103

(22) PCT Filed: Aug. 12, 2014

(86) PCT No.: PCT/CN2014/084197
§ 371 (c)(1),
(2) Date: Sep. 4, 2014

(87) PCT Pub. No.: WO2016/015360
PCT Pub. Date: Feb. 4, 2016

(65) Prior Publication Data
US 2016/0033805 A1    Feb. 4, 2016

(30) Foreign Application Priority Data
Jul. 30, 2014 (CN) .......................... 2014 1 0369639

(51) Int. Cl.
*G02F 1/1345* (2006.01)
*G02F 1/1362* (2006.01)
*G09G 3/36* (2006.01)

(52) U.S. Cl.
CPC ......... *G02F 1/13452* (2013.01); *G02F 1/1362* (2013.01); *G02F 1/136227* (2013.01); *G09G 3/3674* (2013.01); *G09G 2300/0426* (2013.01); *G09G 2320/0223* (2013.01); *G09G 2320/0233* (2013.01)

(58) Field of Classification Search
None
See application file for complete search history.

(56) References Cited

U.S. PATENT DOCUMENTS

2004/0145560 A1* 7/2004 Kim ..................... G09G 3/3406
345/102
2011/0205716 A1* 8/2011 Moriwaki ............. H05K 1/025
361/748

\* cited by examiner

*Primary Examiner* — Seokyun Moon
(74) *Attorney, Agent, or Firm* — Andrew C. Cheng

(57) ABSTRACT

An LCD panel includes a gate driving module, a display unit, and multiple COF packaging units. An output lead wire of the multiple COF packaging units is connected with a gate lead wire of the display unit. The multiple COF packaging units are sequentially connected in series through a signal lead wire and are connected to the gate driving module. A first insulating pattern layer is disposed on the gate lead wire. The first insulating pattern layer is provided with a through-hole structure. The output lead wire is connected with the gate lead wire by utilizing a metal lead wire passing through the through-hole structure. A first through-hole structure connected with a first COF packaging unit has a smaller contacting area comparing to a second through-hole structure connected with a second COF packaging unit. The present invention also discloses a LCD device including the above LCD panel.

16 Claims, 4 Drawing Sheets

LCD PANEL AND LCD DEVICE

BACKGROUND OF THE INVENTION

1. Field of the Invention

The present invention relates to the liquid crystal display (LCD) technology field, and more particularly to an LCD panel and an LCD device including the LCD panel.

2. Description of Related Art

The liquid crystal display device, also known as the LCD (Liquid Crystal Display), is a thin and flat display device, which forms a certain number of color or black-white pixels. The liquid crystal display device includes an LCD panel which is placed in front of a light source or a reflecting plate. The power consumption of the LCD device is very low, and the LCD device has features of high-quality, small size, and light weight, such that everyone loves the LCD device. Therefore, the LCD device becomes the mainstream of the display device.

The LCD device includes a LCD panel and a backlight module. The LCD panel and the backlight module are disposed oppositely. The backlight module provides a light source to the LCD panel so that the LCD panel can display an image. The LCD panel is mainly formed by two transparent substrates and liquid crystals between the two transparent substrates. Currently, the LCD device mainly utilizes a thin-film-transistor (TFT) LCD panel. The backlight module is mainly divided into a direct-light type and a side-light type.

FIG. 1 is a conventional LCD panel utilizing a COF (Chip On Film, fixing an IC die on a flexible circuit board) packaging technology. As shown in FIG. 1, the LCD panel comprises a gate driving module 10, a display unit 20, and two COF packaging units 30a, 30b arranged at a side of the display unit 20. Output lead wires of the two COF packaging unit 30a, 30b are connected with gate lead wires of the display unit 20. The two COF packaging units 30a, 30b are sequentially connected in series through a signal lead wire 60 and are connected with the gate driving module 10. The gate driving module 10 provides scanning signals to the display unit 20 through the two COF packaging units 30a, 30b.

The LCD panel as shown in FIG. 1, because the gate driving module 10 sequentially transmits the signals to the COF packaging units 30a, 30b through the signal lead wire 60, the signals transmitted to the rear packaging unit 30b exist a larger attenuation comparing to the signals transmitted to the front packaging unit 30a. Therefore, after the driving signals are inputted to the display unit 20, because of the signal difference, a weak line 3 is generated at a location between the front COF packaging unit 30a and the rear COF packaging unit 30b when the display unit 20 is displaying an image, that is, a horizontal grayscale difference (also called a H-BLOCK) is generated.

SUMMARY OF THE INVENTION

To solve the above problems of the prior art, the present invention provides a liquid crystal display (LCD) panel, the LCD panel can effectively eliminate the H-BLOCK defect in order to improve the display quality of the panel.

To achieve the above object, the present invention utilizes the following technical solutions:

A liquid crystal display (LCD) panel comprising: a gate driving module; a display unit; and multiple chip on film (COF) packaging units arranged at a side of the display unit and including a first COF packaging unit and a second COF packaging unit, wherein, an output lead wire of the multiple COF packaging units is connected with a gate lead wire of the display unit; the multiple COF packaging units are sequentially connected in series through a signal lead wire and are connected to the gate driving module; the gate driving module provides a scanning signal to the display unit through the multiple COF packaging units;

wherein, a first insulating pattern layer is disposed on the gate lead wire; the first insulating pattern layer is provided with a through-hole structure including a first through-hole structure and a second through-hole structure; the output lead wire is connected with the gate lead wire by utilizing a metal lead wire passing through the through-hole structure; the first through-hole structure connected with the first COF packaging unit has a smaller contacting area comparing to the second through-hole structure connected with the second COF packaging unit; and wherein, the signal lead wire connected between the first COF packaging unit and the gate driving module is shorter, and the signal lead wire connected between the second COF packaging unit and the gate driving module is longer.

Wherein, the gate lead wire comprises a first metal layer and a second metal layer; the first metal layer and the second metal layer are isolated by a second insulating pattern layer; each of the first through-hole structure and the second through-hole structure comprises a first through-hole area and a second through-hole area; the metal lead wire connects with the first metal layer through the first through-hole area; and the metal lead wire connects with the second metal layer through the second through-hole area.

Wherein, each of the first through-hole structure and the second through-hole structure comprises multiple sub-through holes, and each of the sub-through holes is a circular shape or a square shape.

Wherein, each of the first through-hole structure and the second through-hole structure comprises multiple sub-through holes, and each of the sub-through holes is a circular shape or a square shape.

Wherein, a shape and contacting area of each of the sub-through holes of the first through-hole structure is the same as a shape and a contacting area of each of the sub-through holes of the second through-hole structure; and the number of the sub-through holes of the first through-hole structure is smaller than the number of the sub-through holes of the second through-hole structure.

Wherein, a shape of each of the sub-through holes of the first through-hole structure is the same as a shape of each of the sub-through holes of the second through-hole structure; the number of the sub-through holes of the first through-hole structure is the same as the number of the sub-through holes of the second through-hole structure; and a sum of contacting areas of the sub-through holes of the first through-hole structure is smaller than a sum of contacting areas of the sub-through holes of the second through-hole structure.

Wherein, the first through-hole structure comprises multiple sub-through holes and each of the sub-through holes is a circular shape or a square shape; the second through-hole structure comprises one sub-through hole; a contacting area of the one sub-through hole of the second through-hole structure is greater than a sum of contacting areas of the multiple sub-through holes of the first through-hole structure.

Wherein, the metal lead wire is made of indium tin oxides (ITO).

Wherein, the number of the multiple COF packaging units ranges from 2 to 4.

Wherein, the number of the multiple COF packaging units is 2.

The present invention also provides a liquid crystal display (LCD) device comprises a backlight module and an LCD panel disposing oppositely; the backlight module providing a display light to the LCD panel such that the LCD panel can display an image, wherein, the LCD panel is described above.

Beneficial Effects:

The LCD panel provided by the present invention, through disposing the contacting area of the through-hole structure to adjust the resistance value of the connection portion of the output lead wire of the COF packaging unit and the gate lead wire of the display unit such that the attenuation of the driving signal passing through the first COF packaging unit and passing through the second COF packaging unit are similar. As a result, when the display unit is displaying an image, because of the signal difference, an H-BLOCK defect is generated at the location between the first COF packaging unit and the second COF packaging unit. The H-BLOCK defect can be solved.

DETAILED DESCRIPTION OF THE PREFERRED EMBODIMENT

The following content combines with the drawings and the embodiment for describing the present invention in detail. It is obvious that the following embodiments are only some embodiments of the present invention. For the skilled persons of ordinary skill in the art without creative effort, the other embodiments obtained thereby are still covered by the present invention.

As described above, the present invention provides a liquid crystal display (LCD) panel to solve the H-BLOCK defect generated because of the signal difference when the LCD panel is displaying an image in order to improve the display quality of the panel.

Figure 1:
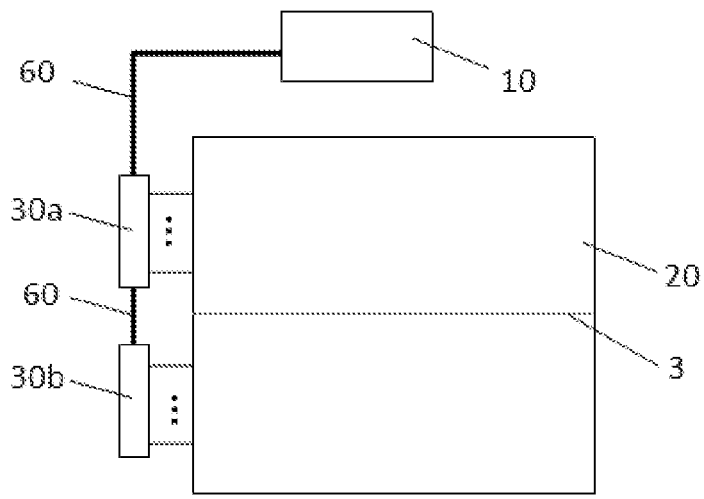
FIG. 1 is a schematic diagram of an LCD panel according to the prior art.
Figure 2:
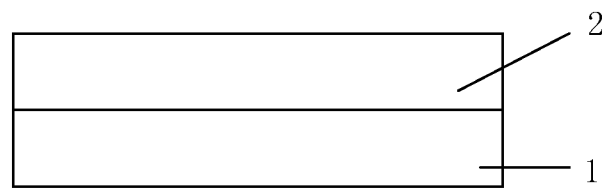
FIG. 2 is a schematic diagram of an LCD device according to an embodiment of the present invention.

As shown in FIG. 2, an embodiment provides a liquid crystal display (LCD) device comprising a backlight module 1 and an LCD panel 2 disposed oppositely to the backlight module 1. The backlight module 1 provides a light source to the LCD panel 2 such that the LCD panel 2 can display an image.

Figure 3:
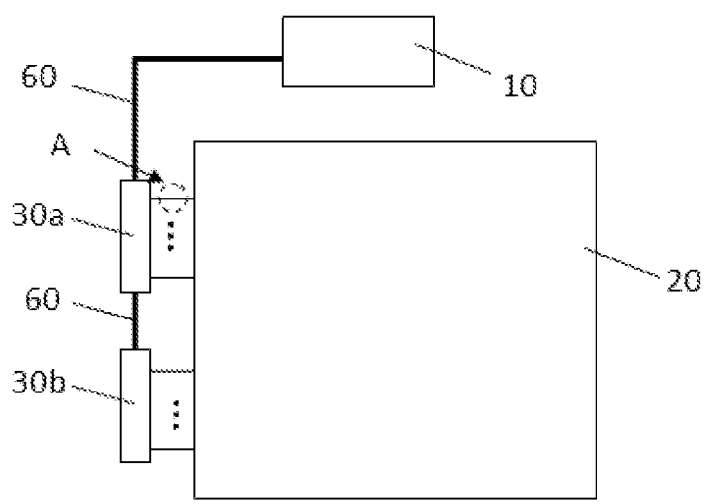
FIG. 3 is a schematic diagram of an LCD panel according to an embodiment of the present invention.
Figure 4:
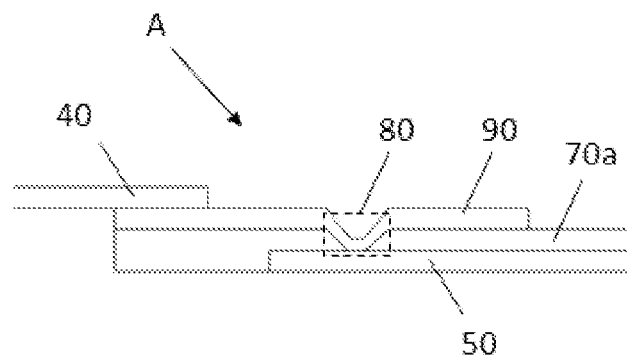
FIG. 4 is cross-sectional view of a connection structure of an output lead wire of the COF packaging unit and a gate lead wire of the display unit according to an LCD panel provided by the present invention, that is, an enlarge diagram of portion A in FIG. 3.
Figure 5:
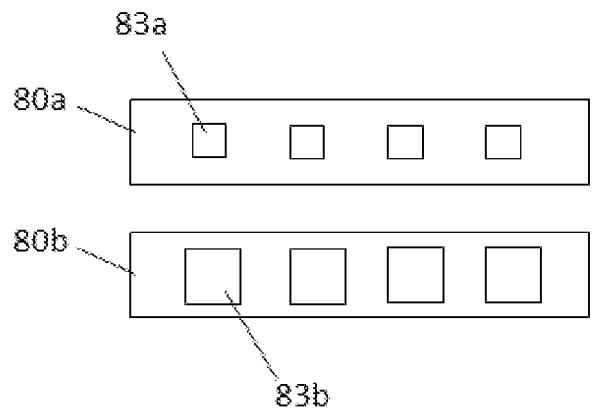
FIG. 5 is a schematic diagram of different through-hole structures of different COF packaging units according to the present invention.

With reference to FIG. 3 to FIG. 5, the LCD panel 2 of the LCD device includes a gate driving module 10, a display unit 20, and two COF packaging units 30a, 30b arranged at a side of the display unit 20. The two COF packaging units 30a, 30b are respectively the first packaging unit 30a, and the second packaging unit 30b. An output lead wire 40 of the two COF packaging units 30a, 30b is connected with a gate lead wire 50 of the display unit 20. The two COF packaging units 30a, 30b are sequentially connected in series through a signal lead wire 60 and are connected to the gate driving module 10. The gate driving module 10 provides a scanning signal to the display unit 20 through the two COF packaging units 30a, 30b.

Specifically, in a portion A of FIG. 3, a connection structure of the output lead wire 40 of the COF packaging unit 30a, 30b and the gate lead wire 50 of the display unit 20 is shown in FIG. 4. A first insulating pattern layer 70a is disposed on the gate lead wire 50 of the display unit 20. The first insulating pattern layer 70a is provided with a through-hole structure 80. The output lead wire 40 of the COF packaging units 30a, 30b is connected with the gate lead wire 50 by utilizing a metal lead wire 90 passing through the through-hole structure 80.

As shown in FIG. 5, a first through-hole structure 80a connected with the first COF packaging unit 30a has a smaller contacting area comparing to a second through-hole structure 80b connected with the second COF packaging unit 30b. Because the contacting area of the first through-hole structure 80a is smaller than the contacting area of the second through-hole structure 80b, the connection resistance of the first through-hole structure 80a is greater than the connection resistance of the second through-hole structure 80b. The signal transmitted into the display unit 20 from the first COF packaging unit 30a has greater signal attenuation. However, for the entire display unit 20, the signal passing through the first packaging unit 30a from the gate driving module 10 and transmitted into the display unit 20 has similar signal attenuation with the signal passing through the first and second packaging units 30a, 30b from the gate driving module 10 and transmitted into the display unit 20. Therefore, the H-BLOCK problem generated at a location between the first COF packaging unit and the second COF packaging unit when the display unit 20 is displaying can be eliminated.

As shown in FIG. 5, the first through-hole structure 80a and the second through-hole structure 80b respectively include four sub-through holes 83a, 83b. Each of the sub-through holes 83a, 83b is a square shape. The contacting area of each of the sub-through holes 83a of the first through-hole structure 80a is smaller than the contacting area of each of the sub-through holes 83b of the second through-hole structure 80b. In FIG. 5, four sub-through holes 83a and four sub-through holes 83b are used as an example for illustrating. In another embodiment, the number of the sub-through holes 83a or the number of the sub-through holes 83b can be selected as other quantities. Besides, the shape of each of the sub-through holes 83a, 83b can be selected as a circular shape or other irregular shapes.

Wherein, the signal lead wire 60 connected between the first COF packaging unit 30a and the gate driving module 10 is shorter, and the signal lead wire 60 connected between the second COF packaging unit 30b and the gate driving module 10 is longer.

Figure 6:
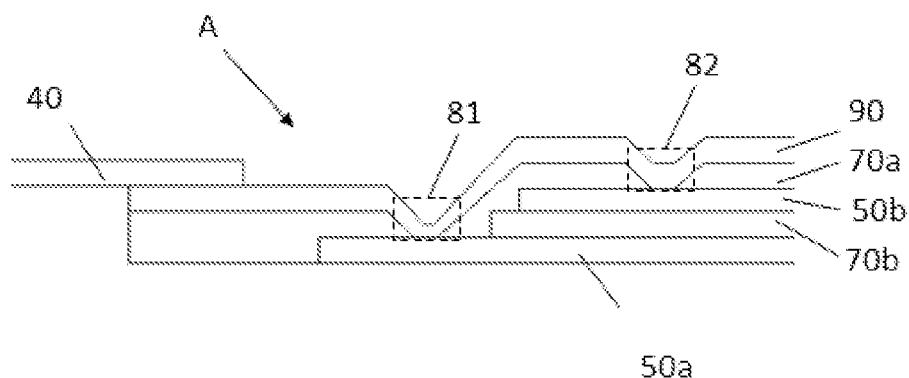
FIG. 6 is cross-sectional view of a connection structure of an output lead wire of the COF packaging unit and a gate lead wire of the display unit according to a preferred embodiment of the present invention.

Currently, because the line width of the gate lead wire 50 of the display unit 20 is smaller, multiple metal layers are utilized to form the gate lead wire 50 to reduce the resistance on the signal transmission line. FIG. 6 is a cross-sectional view of a connection structure of an output lead wire of the COF packaging unit and a gate lead wire of the display unit according to a preferred embodiment of the present invention.

Figure 7:
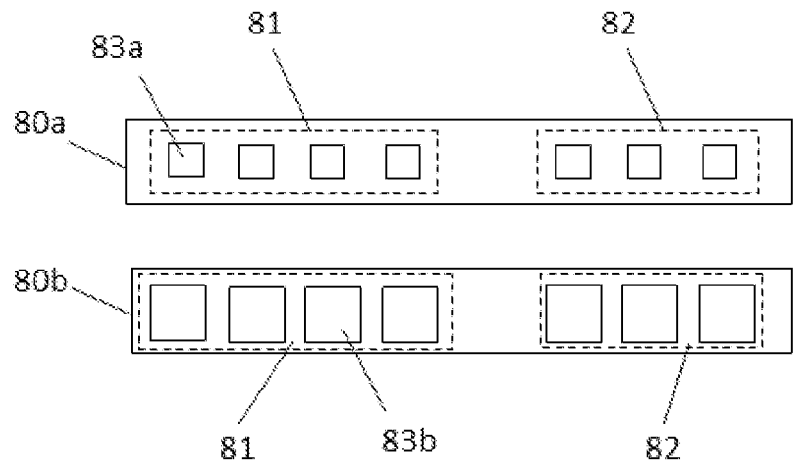
FIG. 7 is a schematic diagram of different through-hole structures according to a preferred embodiment of the present invention.
Figure 8:
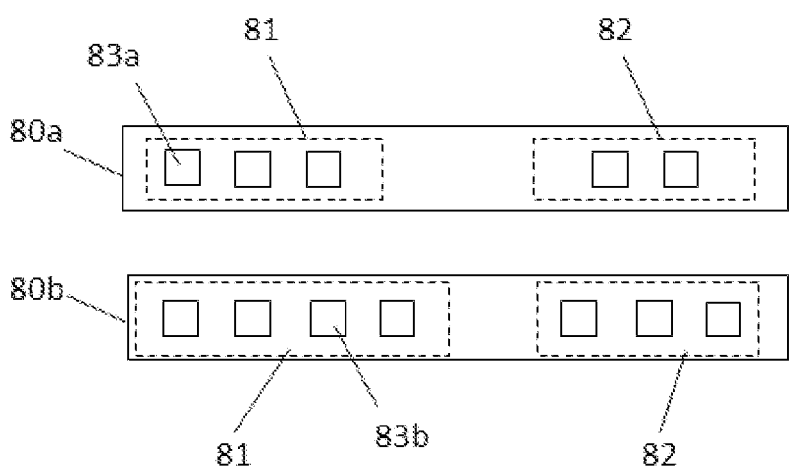
FIG. 8 is a schematic diagram of different through-hole structures according to another preferred embodiment of the present invention.
Figure 9:
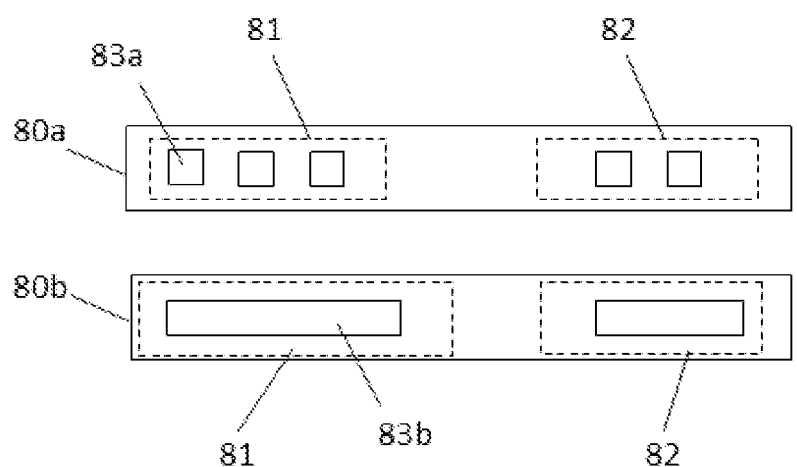
FIG. 9 is a schematic diagram of different through-hole structures according to another preferred embodiment of the present invention.

With reference to FIG. 7 to FIG. 9, the gate lead wire 50 of the display unit 20 includes a first metal layer 50a and a second metal layer 50b. The first metal layer 50a and the second metal layer 50b are isolated by a second insulating pattern layer 70b. The through-hole structure 80 disposed in the first insulating pattern layer 70a includes a first through-hole area 81 and a second through-hole area 82. The metal lead wire 90 connects with the first metal layer 50a through the first through-hole area 81. The metal lead wire 90 connects with the second metal layer 50b through the second through-hole area 82. Wherein, the contacting area of the first through-hole area 81 of the first through-hole structure 80a is smaller than the contacting area of the first through-hole area 81 of the second through-hole structure 80b. The contacting area of the second through-hole area 82 of the first through-hole structure 80a is smaller than the contacting area of the second through-hole area 82 of the second through-hole structure 80b.

The methods for achieving the contacting area of the first through-hole structure 80a being smaller than the contacting area of the second through-hole structure 80b are as following:

(1) As shown in FIG. 7, disposing the sub-through holes 83a of the first through-hole structure 80a and the sub-through holes 83b of the second through-hole structure 80b to have the same shape and quantity; and disposing a contacting area of each of the sub-through holes 83a of the first through-hole structure 80a to be smaller than a contacting area of each of the sub-through holes 83b of the second through-hole structure 80b.

(2) As shown in FIG. 8, disposing each of the sub-through holes 83a of the first through-hole structure 80a and the sub-through holes 83b of the second through-hole structure 80b to have the same shape and contacting area; and disposing the number of the sub-through holes 83a of the first through-hole structure 80a to be smaller than the number of the sub-through holes 83b of the second through-hole structure 80b.

(3) As shown in FIG. 9, disposing the first through-hole structure 80a to include multiple sub-through holes 83a and the second through-hole structure 80b to include one sub-through hole 83b. Wherein, a contacting area of the one sub-through hole 83b of the second through-hole structure 80b is larger than a sum of contacting areas of the multiple sub-through holes 83a of the first through-hole structure 80a.

The above just provides some methods for achieving the contacting area of the first through-hole structure 80a being smaller than the contacting area of the second through-hole structure 80b, and the methods should not limit the scope of the present invention.

In the above embodiments, the metal lead wire 90 is made of indium tin oxide (ITO).

In the above embodiments, the number of the COF packaging units is 2 for illustration. For the LCD panel having more COF packaging units, the structures provided by the above embodiments can also be applied, that is, for any two adjacent COF packaging units, a first through-hole structure connected with a first COF packaging unit has a smaller contacting area comparing to a second through-hole structure connected with a second COF packaging unit. The preferred number of the COF packaging units ranges from 2 to 4.

In summary, in the LCD panel provided by the present invention, through disposing the contacting area of the through-hole structure to adjust the resistance value of the connection portion of the output lead wire of the COF packaging unit and the gate lead wire of the display unit such that the attenuation of the driving signal passing through the first COF packaging unit and passing through the second COF packaging unit are similar. As a result, when the display unit is displaying an image, because of the signal difference, an H-BLOCK defect is generated at the location between the first COF packaging unit and the second COF packaging unit. The H-BLOCK defect can be solved.

It should be noted that, herein, relational terms such as first and second, and the like are only used to distinguish one entity or operation from another entity or operation. It is not required or implied that these entities or operations exist any such relationship or order between them. Moreover, the terms "comprise," include," or any other variation thereof, are intended to cover a non-exclusive inclusion, such that a series of elements including the process, method, article or device that includes not only those elements but also other elements not expressly listed or further comprising such process, method, article or device inherent elements. Without more constraints, by the statement "comprises one . . . " element defined does not exclude the existence of additional identical elements in the process, method, article, or apparatus.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:
1. A liquid crystal display (LCD) panel comprising:
    a gate driving module;
    a display unit; and
    multiple chip on film (COF) packaging units arranged at a side of the display unit and including a first COF packaging unit and a second COF packaging unit, wherein, an output lead wire of the multiple COF packaging units is connected with a gate lead wire of the display unit; the multiple COF packaging units are sequentially connected in series through a signal lead wire and are connected to the gate driving module; the gate driving module provides a scanning signal to the display unit through the multiple COF packaging units;
    wherein, a first insulating pattern layer is disposed on the gate lead wire; the first insulating pattern layer is provided with a through-hole structure including a first through-hole structure and a second through-hole structure; the output lead wire is connected with the gate lead wire by utilizing a metal lead wire passing through the through-hole structure; the first through-hole structure connected with the first COF packaging unit has a smaller contacting area comparing to the second through-hole structure connected with the second COF packaging unit;

wherein, the portion of the signal lead wire connected between the first COF packaging unit and the gate driving module is shorter than the portion of the signal lead wire connected between the second COF packaging unit and the gate driving module; and wherein, the gate lead wire comprises a first metal layer and a second metal layer; the first metal layer and the second metal layer are isolated by a second insulating pattern layer; each of the first through-hole structure and the second through-hole structure comprises a first through-hole area and a second through-hole area; the metal lead wire connects with the first metal layer through the first through-hole area; and the metal lead wire connects with the second metal layer through the second through-hole area.

2. The LCD panel according to claim 1, wherein, each of the first through-hole structure and the second through-hole structure comprises multiple sub-through holes, and each of the sub-through holes is a circular shape or a square shape.

3. The LCD panel according to claim 2, wherein, a shape and contacting area of each of the sub-through holes of the first through-hole structure is the same as a shape and a contacting area of each of the sub-through holes of the second through-hole structure; and the number of the sub-through holes of the first through-hole structure is smaller than the number of the sub-through holes of the second through-hole structure.

4. The LCD panel according to claim 2, wherein, a shape of each of the sub-through holes of the first through-hole structure is the same as a shape of each of the sub-through holes of the second through-hole structure; the number of the sub-through holes of the first through-hole structure is the same as the number of the sub-through holes of the second through-hole structure; and a sum of contacting areas of the sub-through holes of the first through-hole structure is smaller than a sum of contacting areas of the sub-through holes of the second through-hole structure.

5. The LCD panel according to claim 1, wherein, the first through-hole structure comprises multiple sub-through holes and each of the sub-through holes is a circular shape or a square shape; the second through-hole structure comprises one sub-through hole; a contacting area of the one sub-through hole of the second through-hole structure is greater than a sum of contacting areas of the multiple sub-through holes of the first through-hole structure.

6. The LCD panel according to claim 1, wherein, the metal lead wire is made of indium tin oxides (ITO).

7. The LCD panel according to claim 1, wherein, the number of the multiple COF packaging units ranges from 2 to 4.

8. The LCD panel according to claim 1, wherein, the number of the multiple COF packaging units is 2.

9. A liquid crystal display (LCD) device comprising a backlight module and an LCD panel disposing oppositely; the backlight module providing a display light to the LCD panel such that the LCD panel can display an image, wherein, the LCD panel comprises:
 a gate driving module;
 a display unit; and
 multiple chip on film (COF) packaging units arranged at a side of the display unit and including a first COF packaging unit and a second COF packaging unit, wherein, an output lead wire of the multiple COF packaging units is connected with a gate lead wire of the display unit; the multiple COF packaging units are sequentially connected in series through a signal lead wire and are connected to the gate driving module; the gate driving module provides a scanning signal to the display unit through the multiple COF packaging units;

wherein, a first insulating pattern layer is disposed on the gate lead wire; the first insulating pattern layer is provided with a through-hole structure including a first through-hole structure and a second through-hole structure; the output lead wire is connected with the gate lead wire by utilizing a metal lead wire passing through the through-hole structure; the first through-hole structure connected with the first COF packaging unit has a smaller contacting area comparing to the second through-hole structure connected with the second COF packaging unit;

wherein, the portion of the signal lead wire connected between the first COF packaging unit and the gate driving module is shorter than the portion of the signal lead wire connected between the second COF packaging unit and the gate driving module; and wherein, the gate lead wire comprises a first metal layer and a second metal layer; the first metal layer and the second metal layer are isolated by a second insulating pattern layer; each of the first through-hole structure and the second through-hole structure comprises a first through-hole area and a second through-hole area; the metal lead wire connects with the first metal layer through the first through-hole area; and the metal lead wire connects with the second metal layer through the second through-hole area.

10. The LCD device according to claim 9, wherein, each of the first through-hole structure and the second through-hole structure comprises multiple sub-through holes, and each of the sub-through holes is a circular shape or a square shape.

11. The LCD device according to claim 10, wherein, a shape and contacting area of each of the sub-through holes of the first through-hole structure is the same as a shape and a contacting area of each of the sub-through holes of the second through-hole structure; and the number of the sub-through holes of the first through-hole structure is smaller than the number of the sub-through holes of the second through-hole structure.

12. The LCD device according to claim 10, wherein, a shape of each of the sub-through holes of the first through-hole structure is the same as a shape of each of the sub-through holes of the second through-hole structure; the number of the sub-through holes of the first through-hole structure is the same as the number of the sub-through holes of the second through-hole structure; and a sum of contacting areas of the sub-through holes of the first through-hole structure is smaller than a sum of contacting areas of the sub-through holes of the second through-hole structure.

13. The LCD device according to claim 9, wherein, the first through-hole structure comprises multiple sub-through holes and each of the sub-through holes is a circular shape or a square shape; the second through-hole structure comprises one sub-through hole; a contacting area of the one sub-through hole of the second through-hole structure is greater than a sum of contacting areas of the multiple sub-through holes of the first through-hole structure.

14. The LCD device according to claim 9, wherein, the metal lead wire is made of indium tin oxides (ITO).

15. The LCD device according to claim 9, wherein, the number of the multiple COF packaging units ranges from 2 to 4.

16. The LCD device according to claim 9, wherein, the number of the multiple COF packaging units is 2.

* * * * *